(12) United States Patent
Graham, III

(10) Patent No.: US 7,962,675 B1
(45) Date of Patent: Jun. 14, 2011

(54) METHOD AND SYSTEM FOR COMMUNICATING WITH A HOST BUS ADAPTER

(75) Inventor: James B. Graham, III, Austin, TX (US)

(73) Assignee: QLOGIC, Corporation, Aliso Viejo, CA (US)

( * ) Notice: Subject to any disclaimer, the term of this patent is extended or adjusted under 35 U.S.C. 154(b) by 147 days.

(21) Appl. No.: 12/034,913

(22) Filed: Feb. 21, 2008

(51) Int. Cl.
*G06F 13/12* (2006.01)
*G06F 13/38* (2006.01)

(52) U.S. Cl. .......................................... 710/62

(58) Field of Classification Search ................. None
See application file for complete search history.

(56) References Cited

U.S. PATENT DOCUMENTS

| | | | |
|---|---|---|---|
| 7,401,139 B1* | 7/2008 | Allen et al. | 709/224 |
| 2004/0103220 A1* | 5/2004 | Bostick et al. | 709/253 |
| 2004/0205329 A1* | 10/2004 | Wu et al. | 713/2 |

OTHER PUBLICATIONS

SearchStorage.com Definitions, "Host Bus Adapter", Aug. 25, 2005. http://searchstorage.techtarget.com/sDefinition/0,,sid5_gci1083748,00.html.*

Emulex Corporation, "Firmware Update Manual for Emulex HBAs", Copyright 2007, pp. 1-17. http://docs.vlas.co.uk/library2//Emulex//fwupdate.pdf.*

Hewlett-Packard Company, "HP A5159B PCI Dual Port FWD SCSI Host Bus Adapter: Service and User Guide", Edition 1, Copyright 2003, pp. 1-80.*

* cited by examiner

*Primary Examiner* — Tariq Hafiz
*Assistant Examiner* — Dayton Lewis-Taylor
(74) *Attorney, Agent, or Firm* — Klein, O'Neill & Singh, LLP

(57) ABSTRACT

Method and system for a storage area network is provided. The method includes sending a command from a management application executed in a first host system that executes a first operating system; receiving the command at a host bus adapter installed in a second host system that executes a second operating system, where the second operating system has limited capability compared to the first operating system; parsing the command at the host adapter, wherein a management application interface executed by a processor for the host bus adapter parses the command; and performing a task specified by the command, wherein the management interface forwards the command to a component for executing the task specified by the command.

21 Claims, 4 Drawing Sheets

METHOD AND SYSTEM FOR COMMUNICATING WITH A HOST BUS ADAPTER

TECHNICAL FIELD

The present disclosure relates to computing systems, and more particularly, to communicating with a host bus adapter interfacing with a host system using a limited operating system.

BACKGROUND

Storage area networks ("SANs") are commonly used to share and manage data. In SANs, plural memory storage devices are made available to various computing systems (also referred to as host systems). Data in a SAN typically moved between plural host systems (i.e. servers) and storage systems (or storage devices, used interchangeably throughout this specification) through various controllers/adapters.

Host systems often communicate with storage systems via a controller/adapter known as a host bus adapter ("HBA"), using a local bus standard, such as the Peripheral Component Interconnect ("PCI," "PCI-X", or "PCI-Express," all used interchangeably throughout the specification) bus interface.

Typically, a SAN management software app on is used to manage and configure HBAs and other SAN devices. This includes updating HBA firmware and basic input/output settings (BIOS). In conventional systems, host systems typically have installed operating systems with HBA drivers to communicate with SAN management to applications. There may be situations where a HBA is installed in a host system, which may not have a fully functional operating system. In those circumstances, the management application is not able to effectively communicate with the HBA. Therefore, there is a need for a method and system that facilitates effective communication between a management application and a HBA installed in a server without an operating system or with a minimal version of an operating system.

SUMMARY

In one embodiment, a method for a storage area network is provided. The method includes sending a command from a management application executed in a first host system that executes a first operating system; receiving the command at a host bus adapter installed in a second host system that executes a second operating system, where the second operating system has limited capability compared to the first operating system; parsing the command at the host adapter, wherein a management application interface executed by a processor for the host bus adapter parses the command; and performing a task specified by the command, wherein the management interface forwards the command to a component for executing the task specified by the command.

In another embodiment, a system is provided. The system includes a first host system executing a management application within a first operating system; and a second host system executing a second operating system and interfacing with a host bus adapter, wherein the second operating system has limited capability compared to the first operating system; and the host bus adapter includes a processor for executing a management application interface that parses and processes commands received from the management application executed by the first host system.

In yet another embodiment, a host bus adapter installed in a first host computing system that executes a first operating system is provided. The host bus adapter includes a processor for executing a management application interface that parses and processes commands received from a management application executed by a second host system that operates within a second operating system; wherein the second host system interfaces with the first host system; and the first operating system has limited capability compared to the second operating system.

This brief summary has been provided so that the nature of the disclosure may be understood quickly. A more complete understanding of the disclosure can be obtained by reference to the following detailed description of the various embodiments thereof concerning the attached drawings.

BRIEF DESCRIPTION OF THE DRAWINGS

The foregoing features and other features of the present disclosure will now be described with reference to the drawings of various embodiments. In the drawings, the same components have the same reference numerals. The illustrated embodiments are intended to illustrate, but not to limit the disclosure. The drawings include the following Figures.

DETAILED DESCRIPTION

To facilitate an understanding of the various embodiments, the general architecture and operation of an overall networked storage system will be described. The specific architecture and operation of the various embodiments are then described with reference to the general architecture.

System Overview

Figure 1:
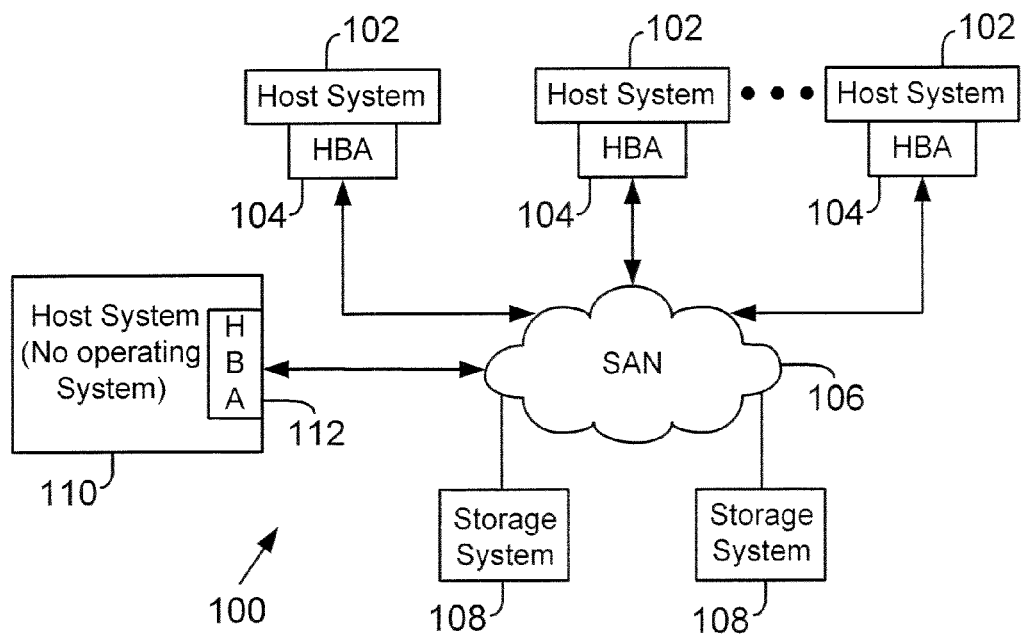
FIG. 1 shows a top level diagram of a network storage system, according to one embodiment of the present disclosure.

FIG. 1 shows an example of a networked storage system 100 that includes a plurality of computing systems (also referred to as "host systems") 102 interfacing with a plurality of storage systems 106 via HBAs 104. Storage systems 108 are coupled to a SAN 106.

Host system 110 is also coupled to SAN 106 via HBA 112 but does not include a fully operational operating system. Instead, host system 110 uses a "thin" version of an operating system to interface with HBA 112.

An example of a "thin operating system" is for example, the EFI system (extensible firmware interface) system originally provided by Intel Corporation. The EFI specification is now maintained by an industry group Unified EFI Forum. An EFI shell can be used to execute other EFI applications, such as setup, install operating system, diagnostic or configuration utilities, and system flash updates; it can also be used to play CDs or DVDs without having to boot to a complete operating system. Shell commands also make it possible to copy or move files and directories between supported file systems.

In a conventional system, a user at a host system (for example, 102) executing a management application is not able to interface with HBA 112 because host system 110 does not have a fully functional operating system. The adaptive embodiments described herein solve this problem by providing a management interface layer at the HBA 112 level. The management interface layer is able to respond to a remote management application, as described below in more detail.

Figure 2:
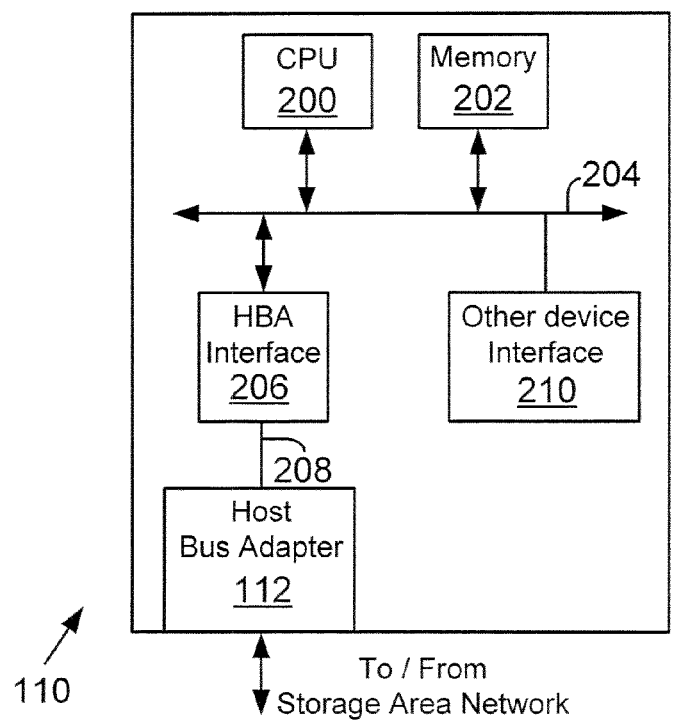
FIG. 2 shows a block diagram of a host system used according to one embodiment of the present disclosure.

Host System:

FIG. 2 shows a block diagram of host system 110 with a central processing unit ("CPU") 200 that executes program instructions out of memory (also referred to as host memory) 202. Host memory 202 is coupled to CPU 200 via a system bus or a local memory bus 204. Memory 202 is used to provide CPU 200 access to data and/or program information that is stored in memory 202 at execution time. Typically, memory 202 is composed of random access memory (RAM) circuits.

It is noteworthy that host system 110 may include a computer, server or other similar devices, which may be coupled to storage systems.

Host system 110 interfaces with a HBA 112 via HBA interface 206. HBA interface 206 includes logic and circuitry to handle transactions, for example, signal conversion and others, based on the type of interconnect 208 between host 110 and HBA 112. In one embodiment, HBA interface 206 is a PCI, PCI-X, PCI-Express interface that supports PCI, PCI-X and/or PCI-Express bus transactions.

Host system 110 may include other devices, interface and logic, for example, a mouse, a display interface and others, jointly shown as 210.

Figure 3:
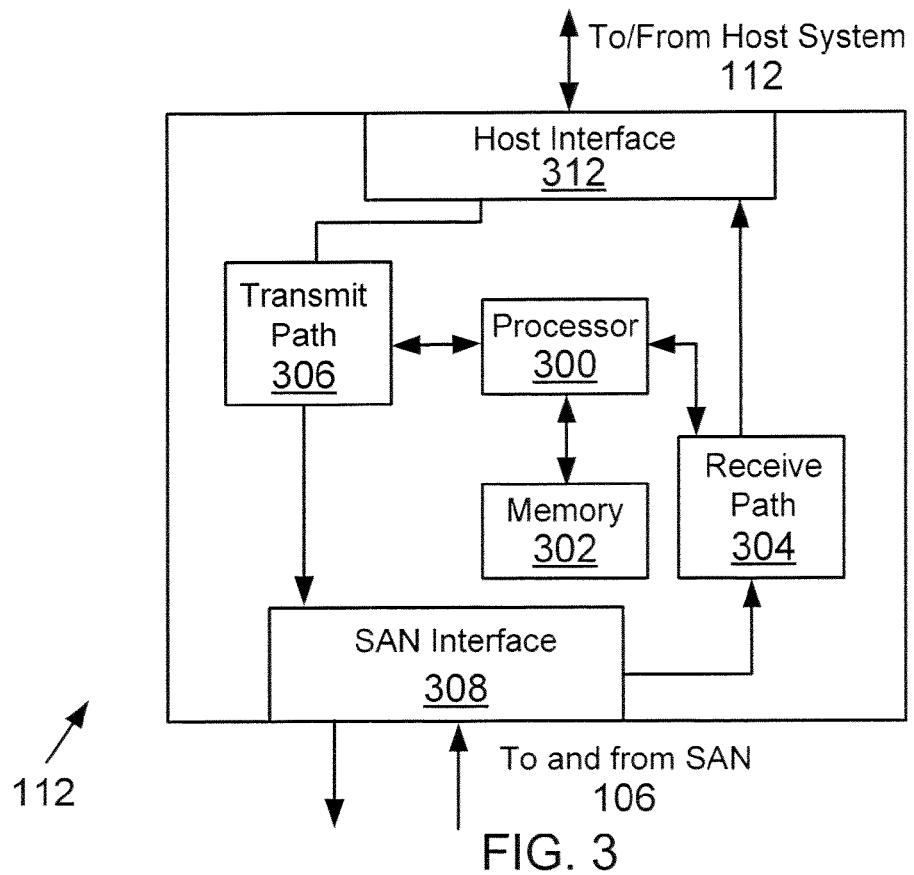
FIG. 3 shows a block diagram of a HBA used according to one embodiment of the present disclosure.

Host Bus Adapter:

FIG. 3 shows a top-level block diagram of HEA 112, used according to one embodiment. HBA 112 includes a main processor (which may be a reduced instruction set computing "RISC" processor) 300 that executes program instructions (also referred to as "firmware") out of memory 302 to control overall HBA 112 operations.

HBA 112 communicates with devices and other host systems via a SAN interface 308. The structure of SAN interface 308 will depend on the protocol that is used by SAN 106 and the devices attached thereto. Different standard protocols may be used to facilitate communication between HBA 112 and SAN 106. For example, Fibre Channel, iSCSI, Infiniband and others can be used. SAN interface 308 includes logic and circuitry to process incoming and outgoing information based on these different protocols. For example, for a Fibre Channel based SAN, SAN interface 308 includes a Fibre Channel Protocol Manager (FPM) and buffers for processing incoming and outgoing Fibre Channel frames.

HBA 112 includes ports (not shown) for communicating with other devices. Information received from other devices via SAN interface 308 is processed by a receive path 304 and then sent to host system 112 via host interface 312. Information from host system 112 is sent via a transmit path 306 and SAN ace 308. Both receive path 304 and transmit path 306 include logic for handling information received via SAN 106 and from host system 110.

Host interface 312 sends and receives information to and from host system 110. The structure of host interface 312 will depend on interconnect 208 that connects HBA 112 to HBA interface 206 in host system 110.

QLogic Corporation, the assignee of the present application, designs and manufactures different type of HBAs. More information on HBAs is available from QLogic's website located at qlogic.com.

Figure 4:
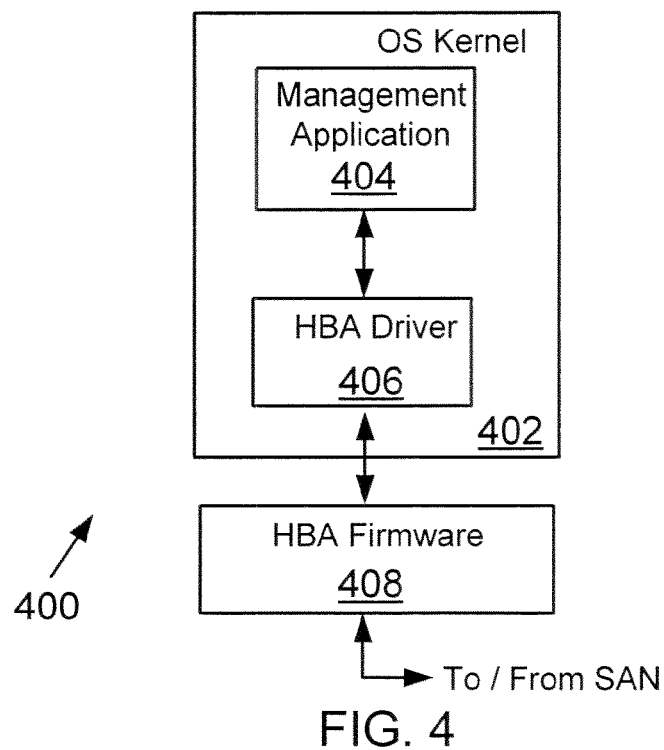
FIG. 4 shows a block diagram of an example of a software architecture for communicating with a HBA, according to one embodiment.

Software Architecture:

FIG. 4 shows a block diagram of standard software architecture 400 for operating HBA 104 installed in host system 102 that uses fully functional operating system 402. Operating system 402 controls overall operation of host system 102 and may be Unix, Windows® or Linux based. It is noteworthy that the present is not based on any particular operating system.

Management Application (also referred to as Application) 404 is a software program executed by host system 102 to perform SAN 106 management functions. An example, of such an application is the SANSurfer® application provided by Qlogic Corporation, the assignee of the present application.

Application 404 sends commands via HBA driver 406 that interfaces with HBA firmware 408. HEA firmware 408 is executed out of memory 302 (FIG. 3) and is used to control overall HBA 112 operations.

Figure 5:
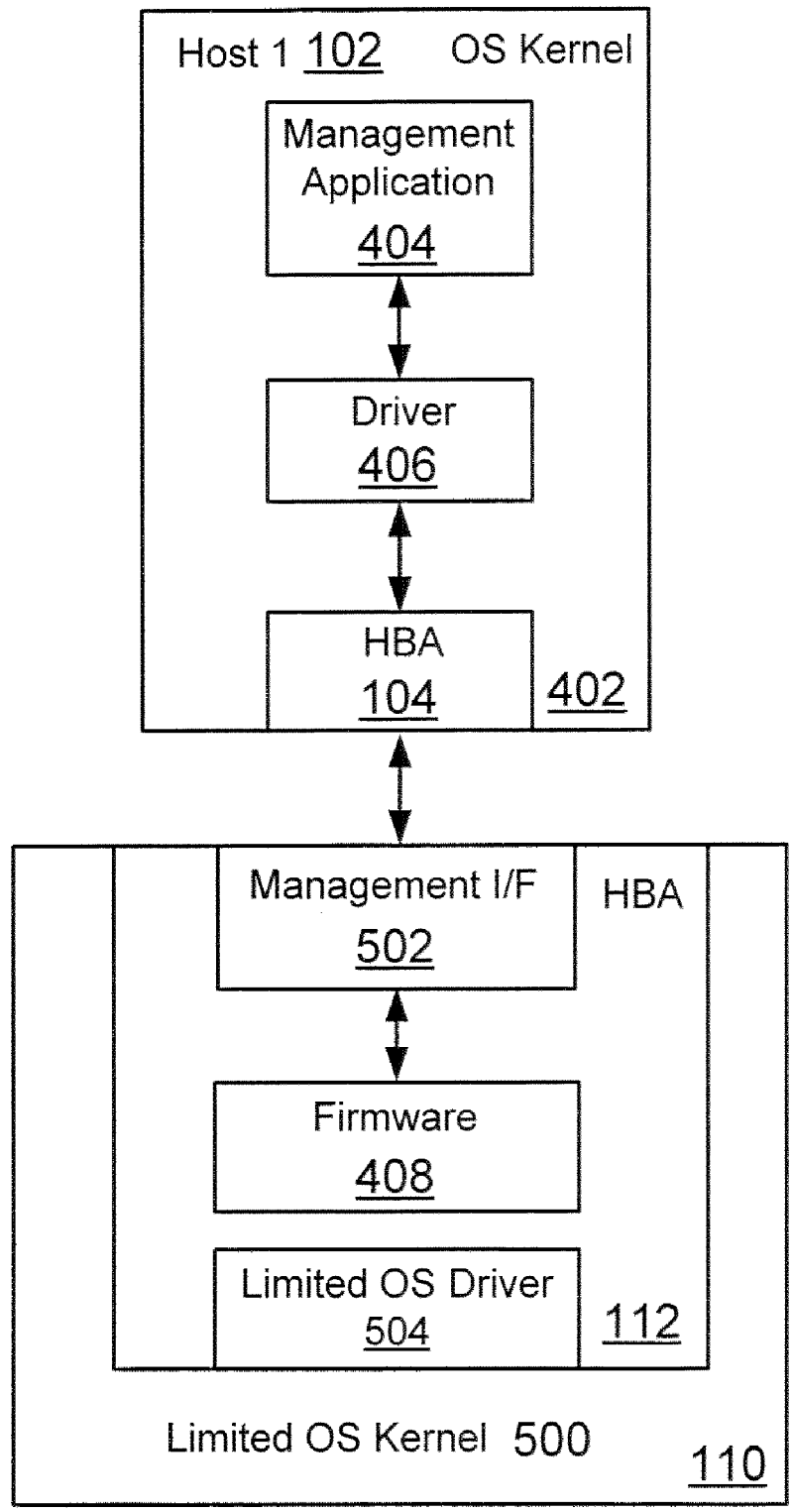
FIG. 5 shows a block diagram of a software architecture for communicating with a HBA installed in a host system without an operating system or a minimal version of the operating system, according to one embodiment of the present disclosure.

FIG. 5 shows an example of host system 102 interfacing with host system 110 using software architecture of the present disclosure, according to one embodiment. Host system 102 utilizes the software components described above with respect to FIG. 4. Host system 110 uses a limited operating system kernel 500. In one embodiment, kernel 500 does not include all the functionality that is provided by and available to operating system 402.

HBA 112 includes limited OS (operating system) driver 504 that is used to interface with limited operating system kernel 500. Limited OS driver 504 may be an EFI (Extensible Firmware Interface) driver if the limited OS kernel 500 is EFI based.

Figure 6:
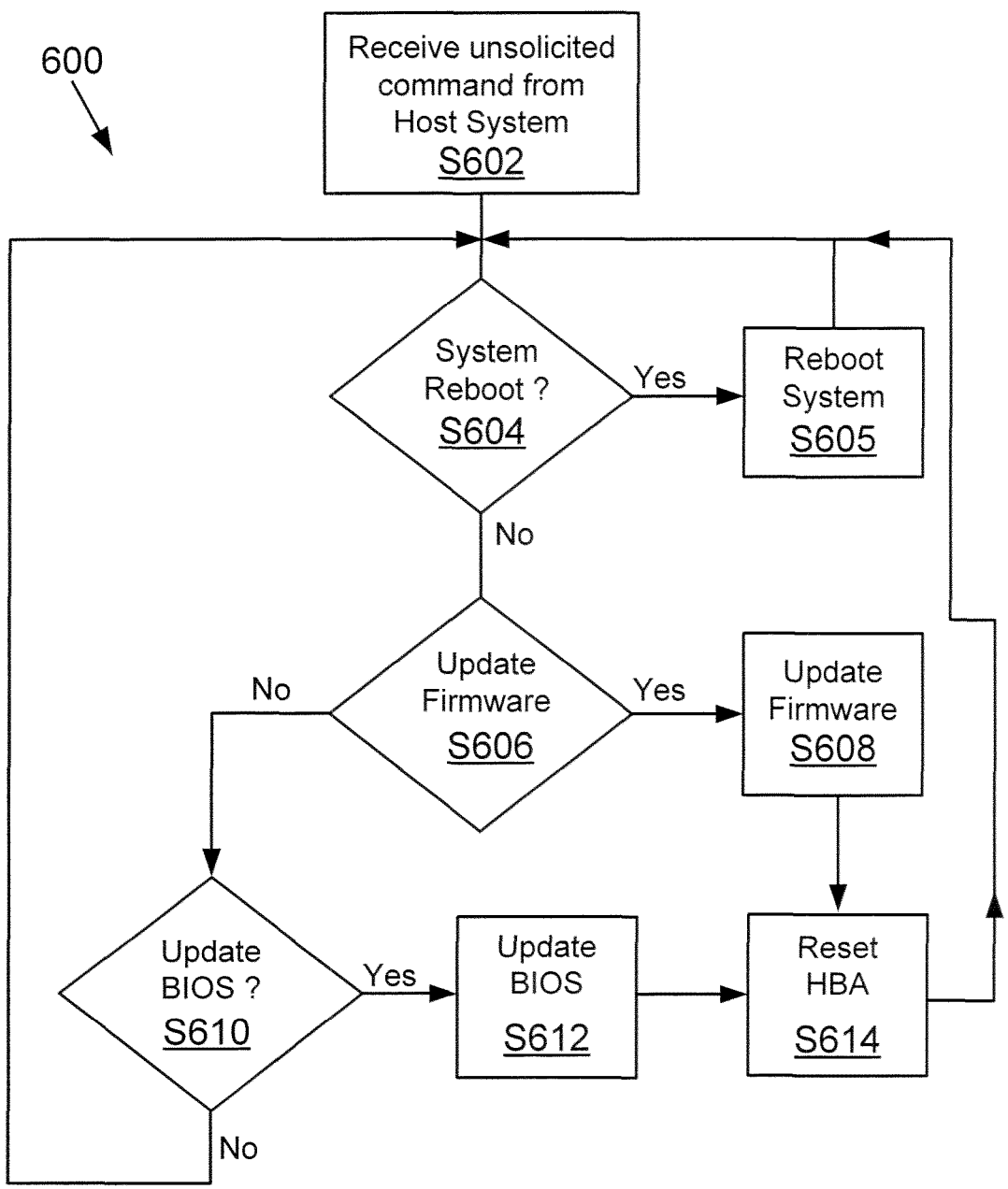
FIG. 6 shows a process flow diagram for communicating with a host bus adapter, according to one embodiment of the present disclosure.

HBA 112 further includes a management interface 502 that is capable of interfacing with management application 404. Management interface 502 can respond to status queries from management application 404 and perform other functions that are described below with respect to FIG. 6. Management interface 502 allows HBA 112 to communicate with host 102 even though HBA 112 is installed in a host system that does not have a fully functional operating system Process Flow:

FIG. 6 shows a process flow diagram, 600 for communicating with a HBA that is installed in a system without a fully functional operating system (for example, 110, FIG. 1). Process 600 begins in step S602, when HBA is 112 receives an unsolicited command from another host, for example, 102 executing application 404 (FIG. 5).

In step S604, the management application interface 502 determines if the received command is for a system reboot (or re-initialization). If yes, then in step S605, management interface 502 passes the command to limited OS kernel 500 via limited OS driver 504 and firmware 408 to reboot host system 110.

If in step S604, the command is not for rebooting the system, then management interface 502 determines if the command is to update firmware 408 in step S606. If yes, then in step S608, firmware 408 is updated.

If the command is not for a firmware update, then in step S610, management interface 502 determines if the command is for a basic input/output system (BIOS) information update. If yes, then in step S612, the BIOS information is updated. Thereafter, HBA 112 is reset in step S614.

If in step S610, management interface 502 determines that the command is not for a BIOS update and it cannot handle the command, then the process loops back to step S604, where another command is processed.

In one embodiment, a system and process is provided that allows a HBA to effectively communicate with other systems even though the HBA is installed in a host system with a limited OS kernel.

Although the present disclosure has been described with reference to specific embodiments, these embodiments are illustrative only and not limiting. Many other applications and embodiments of the present disclosure will be apparent in light of this disclosure and the following claims. The foregoing adaptive aspects are useful for any networking environment where there is disparity between link transfer rates.

What is claimed is:

1. A method for a storage area network, comprising:
    a management application executed by a first host system that executes a first operating system sending a command to a second host system;
    an adapter installed in the second host system receiving the command the second host system executing a second operating system that has limited capability compared to the first operating system, such that the second operating system is not fully functional to interface with the first host system via its adapter;
    a processor of the adapter installed in the second host system executing a management application interface stored in the adapter installed in the second host system;
    the management application interface executed by the adapter installed in the second host system parsing the command; and
    performing a task specified by the command, wherein the task is one or more of rebooting the second host system, updating firmware code for the adapter and updating information for the second host system and the management application interface forwards the command to an executable component of the adapter for executing the task specified by the command.

2. The method of claim 1, wherein if the command is for a system reboot, the management application interface passes the command to the second operating system to reboot the second host system.

3. The method of claim 1, wherein if the command is for updating the firmware code, the management application interface updates firmware code for the adapter.

4. The method of claim 1, wherein if the command is for updating basic input and output system (BIOS) information of the second host system, the management application interface passes the command to the second operating system for updating the BIOS information.

5. The method of claim 1, wherein the adapter is a Fibre Channel based adapter.

6. The method of claim 1, wherein the adapter is non-Fibre Channel based adapter.

7. A system, comprising:
    a first host system executing a management application within a first operating system;
    a second host system executing a second operating system and interfacing with an adapter installed in the second host system, wherein the second operating system has limited capability compared to the first operating system such that the second operating system is not fully functional to interface with the first host system via the adapter;
    a processor in the adapter in the second host system; and
    a management application interface in the adapter in the second host system that is executed by the processor of the adapter in the second host system;
    wherein the management application interface executed by the processor of the adapter in the second host system is configured to receive a command from the management application executed by the first host system, parse the received command, and process the command to perform a task specified by the command, wherein the task is one or more of rebooting the second host system, updating firmware code for the adapter and updating information for the second host system, and the management interface forwards the command to a component for executing the task specified by the command.

8. The system of claim 7, wherein the management application sends a command to the adapter of the second host system and if the command is for a system reboot, the management application interface passes the command to the second operating system to reboot the second host system.

9. The system of claim 7, wherein the management application sends a command to the adapter of the second host system and if the command is for updating the firmware code, the management application interface updates firmware code for bus adapter.

10. The system of claim 7, wherein the management application sends a command to the adapter of the second host system and if the command is for updating basic input and output system (BIOS) information of the second host system, the management application interface passes the command to the second operating system for updating the BIOS information.

11. The system of claim 7, wherein the adapter is a Fibre Channel based adapter.

12. The system of claim 7, wherein the adapter is non-Fibre Channel based adapter.

13. An adapter installed in a first host computing system that executes a first operating system, comprising:
    a processor and a management application interface executed by the processor of the adapter;
    wherein the management application interface is configured to receive a command from a management application executed by a second host system that operates within a second operating system, a parse the received command, and process the command to perform a task specified by the command, wherein the task is one or more of rebooting the first host system, updating firmware code for the adapter, and updating information for the first host system, and the management interface forwards the command to a component for executing the task specified by the command; wherein the second host system interfaces with the first host system; and the first operating system has limited capability compared to the second operating system such that the first operating system is not fully functional to interface with the second host system via the adapter.

14. The adapter of claim 13, wherein the management application sends a command to the adapter of the first host system and if the command is for a system reboot, the management application interface passes the command to the first operating system to reboot the first host system.

15. The adapter of claim 13, wherein the management application sends a command to the adapter of the first host system and if the command is for updating the firmware code, the management application interface updates firmware code for the adapter.

16. The adapter of claim 13, wherein the management application sends a command to the adapter of the first host system and if the command is for updating basic input and output system (BIOS) information of the first host system, the management application interface passes the command to the first operating system for updating the BIOS information.

17. The adapter of claim 13, wherein the adapter is a Fibre Channel based adapter.

18. The host bus adapter of claim 13, wherein the host bus adapter is non-Fibre Channel based adapter.

19. A machine implemented method, comprising:

sending a command from a management application executed by a first host system within a first operating system context;

receiving the command at an adapter for a second host system executing a second operating system with limited capabilities when compared to the first operating system such that the second operating system is not fully functional to interface with the first host system via the adapter;

the adapter for the second host system executing a management application interface installed in the second host system; and performing a task specified by the command, wherein the management application interface forwards the command to an executable component of the adapter for executing the task specified by the command; wherein when the command is for a system reboot, the management application interface passes the command to the second operating system to reboot the second host system; wherein when the command is for updating firmware code of the adapter, the management application interface updates firmware code for the adapter; and wherein when the command is for updating basic input and output system (BIOS) information of the second host system, the management application interface passes the command to the second operating system for updating the BIOS information.

20. The method of claim 19, wherein the second operating system is an extensible firmware interface (EFI) based system that is used to interface with the adapter for the second host system.

21. The method of claim 19, wherein the adapter executes a limited operating system driver to interface with the second operating system.

* * * * *

UNITED STATES PATENT AND TRADEMARK OFFICE
CERTIFICATE OF CORRECTION

| | | |
|---|---|---|
| PATENT NO. | : 7,962,675 B1 | Page 1 of 1 |
| APPLICATION NO. | : 12/034913 | |
| DATED | : June 14, 2011 | |
| INVENTOR(S) | : James B. Graham, III | |

It is certified that error appears in the above-identified patent and that said Letters Patent is hereby corrected as shown below:

In column 1, line 17, delete "SAN" and insert -- SAN is --, therefor.

In column 1, line 26, delete "app on" and insert -- application --, therefor.

In column 1, line 31, before "applications." delete "to".

In column 3, line 5, delete "HEA" and insert -- HBA --, therefor.

In column 3, line 30, delete "PCI-X," and insert -- PCI-X, or --, therefor.

In column 3, line 37, delete "HEA" and insert -- HBA --, therefor.

In column 4, line 20, delete "HEA" and insert -- HBA --, therefor.

In column 4, line 48, before "112" delete "is".

In column 6, line 22, in Claim 9, after "for" delete "bus".

In column 7, line 5, in Claim 18, after "The" delete "host bus".

In column 7, line 5, in Claim 18, after "the" delete "host bus".

Signed and Sealed this
Thirtieth Day of August, 2011

David J. Kappos
*Director of the United States Patent and Trademark Office*